(12) United States Patent
Zatz

(10) Patent No.: US 6,664,963 B1
(45) Date of Patent: Dec. 16, 2003

(54) SYSTEM, METHOD AND COMPUTER PROGRAM PRODUCT FOR PROGRAMMABLE SHADING USING PIXEL SHADERS

(75) Inventor: Harold Robert Feldman Zatz, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 79 days.

(21) Appl. No.: 09/977,522

(22) Filed: Oct. 12, 2001

Related U.S. Application Data

(63) Continuation-in-part of application No. 09/585,809, filed on May 31, 2000.

(51) Int. Cl.[7] ............................................. G06T 15/60
(52) U.S. Cl. .................... 345/426; 345/506; 345/582; 345/586; 345/587
(58) Field of Search .......................... 345/419, 426, 345/582, 558, 587, 552, 428, 441, 506, 586

(56) References Cited

U.S. PATENT DOCUMENTS

| | | | | |
|---|---|---|---|---|
| 4,615,013 A | * | 9/1986 | Yan et al. .................... | 345/582 |
| 4,866,637 A | * | 9/1989 | Gonzalez-Lopez et al. . | 345/426 |
| 4,996,666 A | | 2/1991 | Duluk, Jr. .................... | 365/49 |
| 5,535,288 A | | 7/1996 | Chen et al. ................. | 382/236 |
| 5,572,634 A | | 11/1996 | Duluk, Jr. .................... | 395/119 |
| 5,574,835 A | | 11/1996 | Duluk, Jr. et al. .......... | 395/121 |
| 5,596,686 A | | 1/1997 | Duluk, Jr. et al. .......... | 395/122 |
| 5,669,010 A | | 9/1997 | Duluk, Jr. .............. | 395/800.22 |
| 5,880,736 A | * | 3/1999 | Peercy et al. ................ | 345/426 |
| 5,977,987 A | | 11/1999 | Duluk, Jr. .................... | 345/441 |
| 6,198,488 B1 | * | 3/2001 | Lindholm et al. .......... | 345/426 |
| 6,229,553 B1 | | 5/2001 | Duluk, Jr. et al. .......... | 345/506 |
| 6,268,875 B1 | | 7/2001 | Duluk, Jr. et al. .......... | 345/506 |
| 6,285,378 B1 | | 9/2001 | Duluk, Jr. .................... | 345/441 |
| 6,288,730 B1 | | 9/2001 | Duluk, Jr. et al. .......... | 345/552 |
| 6,466,222 B1 | * | 10/2002 | Kao et al. .................... | 345/558 |

FOREIGN PATENT DOCUMENTS

| | | | |
|---|---|---|---|
| WO | 93/23816 | 11/1993 | ......... G06F/15/334 |
| WO | 97/05575 | 2/1997 | ........... G06T/15/00 |
| WO | 97/05576 | 2/1997 | ........... G06T/15/00 |
| WO | 00/10372 | 3/2000 | |
| WO | 00/11562 | 3/2000 | ........... G06F/15/00 |
| WO | 00/11602 | 3/2000 | |
| WO | 00/11603 | 3/2000 | |
| WO | 00/11604 | 3/2000 | |
| WO | 00/11605 | 3/2000 | |
| WO | 00/11607 | 3/2000 | ............. G06T/1/20 |
| WO | 00/11613 | 3/2000 | ........... G06T/15/00 |
| WO | 00/11614 | 3/2000 | ........... G06T/17/00 |
| WO | 00/19377 | 4/2000 | ........... G06T/15/00 |

* cited by examiner

*Primary Examiner*—Mark Zimmerman
*Assistant Examiner*—Kimbinh T. Nguyen
(74) *Attorney, Agent, or Firm*—Cooley Godward LLP

(57) ABSTRACT

A system, method and computer program product are provided for performing shader calculations in a graphics pipeline. Initially, a shading calculation is performed in order to generate output. Thereafter, an additional shading calculation is carried out. Such additional shading calculation includes converting the output of the shading calculation into a floating point format. Further, a dot product is calculated utilizing the converted output and texture coordinates. The dot product is then clamped. Next, the clamped dot product is stored in a plurality of color components.

28 Claims, 8 Drawing Sheets

SYSTEM, METHOD AND COMPUTER PROGRAM PRODUCT FOR PROGRAMMABLE SHADING USING PIXEL SHADERS

RELATED APPLICATION(S)

This application is a continuation-in-part of a parent application filed May 31, 2000, under Ser. No. 09/585,809. This application further related to a application entitled "IMPROVED GRAPHICS PIPELINE INCLUDING COMBINER STAGES" filed Mar. 20, 1999 naming David B. Kirk, Matthew Papakipos, Shaun Ho, Walter Donovan, and Curtis Priem as inventors, and which is incorporated herein by reference in its entirety.

FIELD OF THE INVENTION

The present invention relates to computer graphics, and more particularly to texture sampling in a computer graphics processing pipeline.

BACKGROUND OF THE INVENTION

Recent advances in computer performance have enabled graphic systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, e.g., a triangle, or a vector. All graphic pictures are formed with combinations of these graphic primitives. Many procedures may be utilized to perform graphic primitive rendering.

Early graphic systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or a function onto a surface in three dimensions. Texture mapping is a relatively efficient technique for creating the appearance of a complex image without the tedium and the high computational cost of rendering the actual three dimensional detail that might be found on a surface of an object.

Prior Art FIG. 1 illustrates a graphics pipeline with which texture mapping may be performed. As shown, included is a transform engine 100, a set-up module 102, a rasterizer 104, a texture math module 106, a level of detail (LOD) calculator 108, a texture fetch module 110, a texture filter 112, and a texture combination engine 114. It should be noted that the transform engine 100 and set-up module 102 need not necessarily be required in the graphics pipeline of a graphics integrated circuit.

During operation, the transform engine 100 may be used to perform scaling, rotation, and projection of a set of three dimensional vertices from their local or model coordinates to the two dimensional window that will be used to display the rendered object. The setup module 102 utilizes the world space coordinates provided for each triangle to determine the two dimensional coordinates at which those vertices are to appear on the two dimensional window. Prior Art FIG. 2 illustrates the coordinates 200 of the vertices 201 which define a triangle 202. If the vertices 201 of the triangle 202 are known in screen space, the pixel positions vary along scan lines within the triangle 202 in screen space and may be determined.

The setup module 102 and the rasterizer module 104 together use the three dimensional world coordinates to determine the position of each pixel contained inside each of the triangles. Prior Art FIG. 3 illustrates a plurality of pixels 300 identified within the triangle 202 in such a manner. The color values of the pixels in the triangle 202 vary from pixel to pixel in world space. During use, the setup module 102 and the rasterizer module 104 generate interpolated colors, depth and texture coordinates.

The setup module 102 and the rasterizer module 104 then feed the pixel texture coordinates to the texture math module 106 to determine the appropriate texture map colors. In particular, texture coordinates are generated that reference a texture map using texture coordinate interpolation which is commonly known to those of ordinary skill in the art. This is done for each of the pixels 300 identified in the triangle 202. Prior Art FIG. 3 illustrates texture coordinates 302 for the pixels 300 identified within the triangle 202.

Next, a LOD calculation is performed by the LOD calculator 108. Occasionally during rendering, one texel, or texture element, will correspond directly to a single pixel that is displayed on a monitor. In this situation the level of detail (LOD) is defined to be equal to zero (0) and the texel is neither magnified nor minified. However, the displayed image can be a magnified or minified representation of the texture map. If the texture map is magnified, multiple pixels will represent a single texel. A magnified texture map corresponds to a negative LOD value. If the texture map is minified, a single pixel represents multiple texels. A minified texture map corresponds to a positive LOD value. In general, the LOD value corresponds to the number of texels in the texture map 'covered' by a single pixel.

The amount of detail stored in different LOD representations may be appreciated by drawing an analogy to the detail perceived by an observer while observing a texture map. For example, very little detail may be perceived by an observer while watching an automobile from a distance. On the other hand, several details such as doors, windows, mirrors will be perceived if the observer is sufficiently close to the automobile. A finer level LOD will include such additional details, and a courser LOD will not.

Once the appropriate level of detail of the texture map is selected based on the calculated LOD value, the texture coordinates generated by the texture math module 106 are used to fetch the appropriate texture map colors using the texture fetch module 110. These texture map colors are then filtered by the texture filter module 112. The combiner engine 114 combines together the various colors and textures fetched by the texture fetch module 110 and filtered by the texture filter module 112.

It is important to note that the pipeline described hereinabove has a linear topology. These and other simplistic non-linear pipelines only enable one texture fetch and texture calculation per rendering pass. This is a limited design that is static in nature. There is thus a need for a pipeline that allows for more dynamic texture fetches and shading calculations, and in particular, the ability for feeding filter results back to influence subsequent texture address calculations.

DISCLOSURE OF THE INVENTION

A system, method and computer program product are provided for performing shader calculations in a graphics pipeline. Initially, a shading calculation is performed in order to generate output. Thereafter, an additional shading calculation is carried out. Such additional shading calculation includes converting the output of the shading calculation into a floating point format. Further, a dot product is calculated utilizing the converted output and texture coordinates. The dot product is then clamped. Next, the clamped dot product is stored in a plurality of color components.

In one embodiment, the output may be converted into the floating point format utilizing a remapping operation. Further, the dot product may be clamped to [0.0, 1.0]. As yet another option, the clamped dot product may be stored in the color components utilizing a smearing operation. Still yet, the color components may include an A-component, an R-component, a G-component, and/or a B-component.

In another embodiment, the additional shading calculation may be repeated. Further, the output of the shading calculations may be combined. As an option, texture information may be retrieved using the texture coordinates which are associated with the output of the shading calculation. As such, the additional shading calculation may be performed using the texture information.

Another system, method and computer program product are provided for performing shader calculations in a graphics pipeline. Initially, a shading calculation is performed in order to generate output. Next, an additional shading calculation is carried out. Such additional shading calculation converts the output of the shading calculation into a floating point format. Further, a dot product (dp) is calculated utilizing the converted output and texture coordinates. Still yet, texture information is retrieved utilizing the dot product (dp).

In one embodiment, the output may be converted into the floating point format utilizing a remapping operation. Still yet, the texture information may be one-dimensional, two-dimensional, etc. As an option, the texture information may be retrieved utilizing coordinates (dp,0).

In another embodiment, the additional shading calculation may be repeated. Further, the output of the shading calculations may be combined. As an option, at least one of the additional shading calculations may be performed using the texture information.

Still another system, method and computer program product are provided for performing shader calculations in a graphics pipeline. A shading calculation is initially performed in order to generate output. Further, an additional shading calculation is performed which includes converting the output of the shading calculation into a floating point format. Moreover, texture information is retrieved utilizing the converted output.

In one embodiment, the output may be converted into the floating point format utilizing a remapping operation. Further, the texture information may be two-dimensional, three-dimensional, etc. Still yet, the texture information may include a cubemap.

In another embodiment, the additional shading calculation may be repeated. Further, the output of the shading calculations may be combined. As an option, at least one of the additional shading calculations may be performed using the texture information.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior Art

Prior Art

Prior Art

DESCRIPTION OF THE PREFERRED EMBODIMENTS

Figure 1:
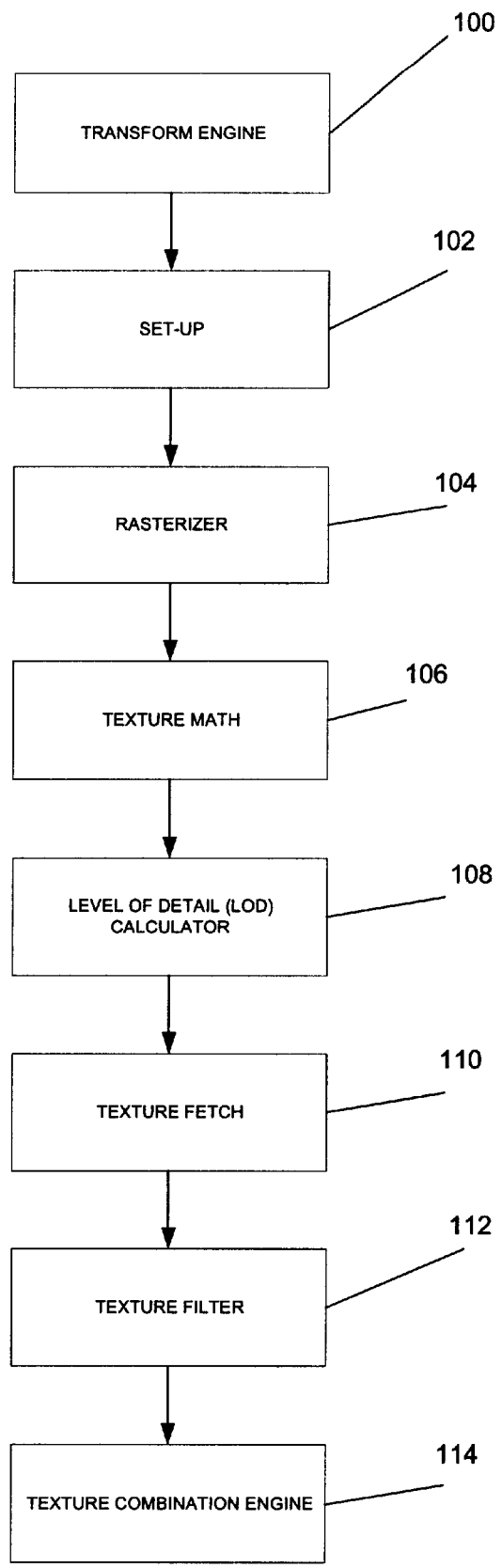
FIG. 1 illustrates a graphics pipeline with which texture mapping may be performed.
Figure 2:
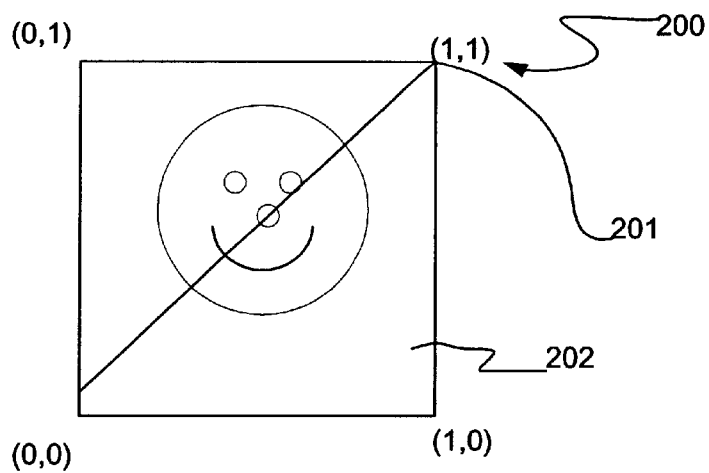
FIG. 2 illustrates the coordinates of the vertices which define a triangle.
Figure 3:
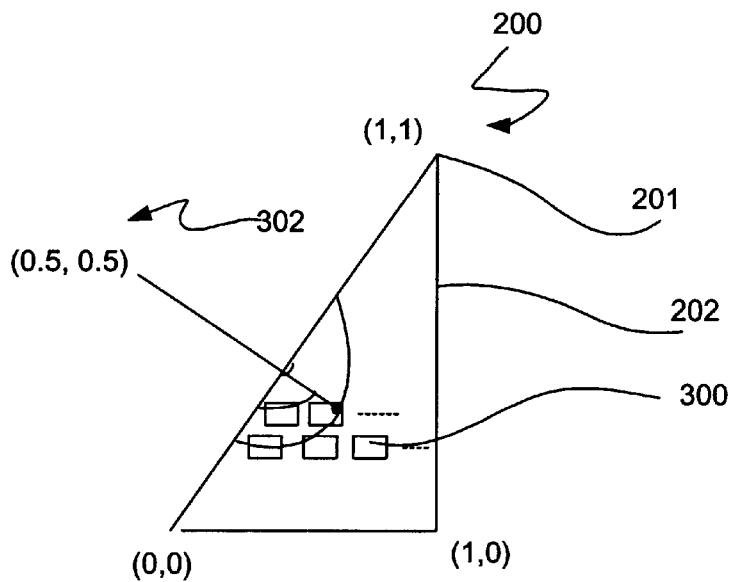
FIG. 3 illustrates a plurality of pixels identified within the triangle of FIG. 2.
Figure 4:
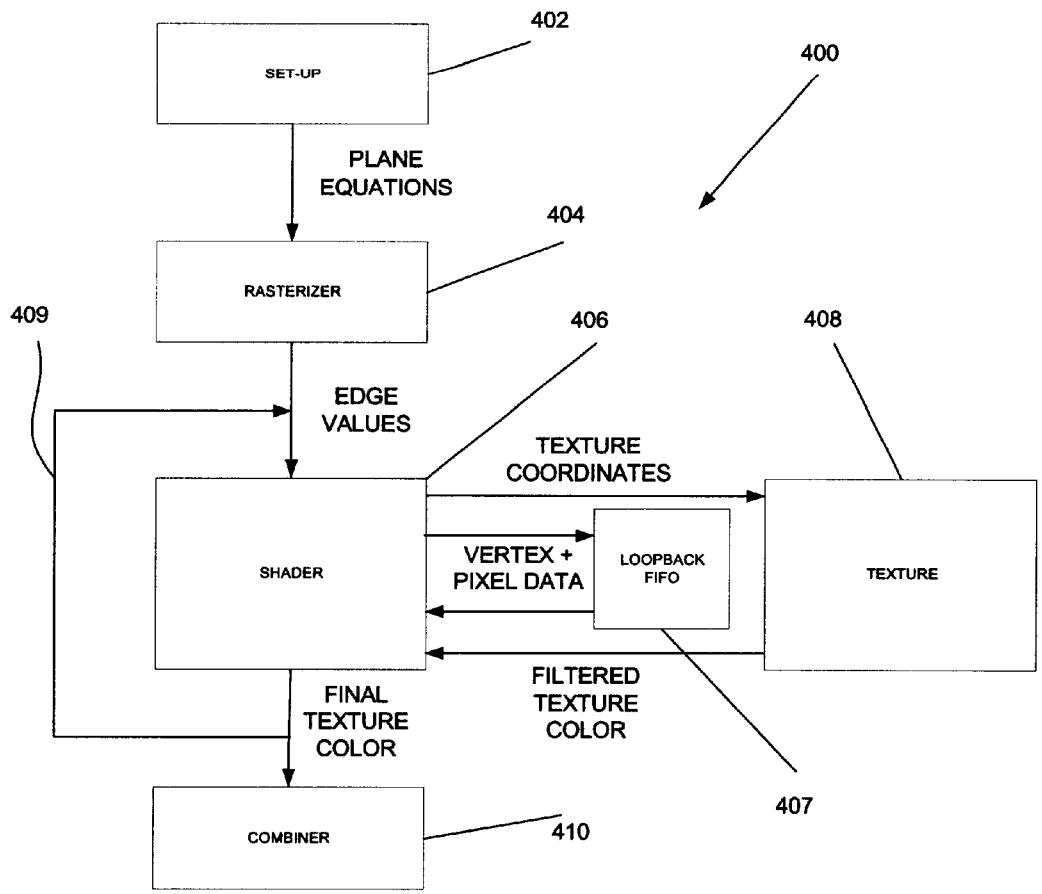
FIG. 4 illustrates a hardware implementation for programmable shading in accordance with one embodiment of the present invention.

FIGS. 1–3 illustrate the prior art. FIG. 4 shows an illustrative hardware implementation of the present invention. As shown, included is a set-up module 402, a rasterizer 404, a shader module 406, a texture fetch module 408, and a combiner 410 coupled to form a portion of a graphics processing pipeline 400. For reasons that will soon become apparent, a feedback loop 409 is coupled between an output of the shader module 406 to an input thereof. It should be noted that the set-up module 402, rasterizer 404, and combiner 410 operate in a conventional manner as set forth during reference to FIG. 1. While the combiner 410 may be implemented in any desired manner, one exemplary implementation is disclosed in a co-pending application entitled "IMPROVED GRAPHICS PIPELINE INCLUDING COMBINER STAGES" filed Mar. 20, 1999 naming David B. Kirk, Matthew Papakipos, Shaun Ho, Walter Donovan, and Curtis Priem as inventors, and which is incorporated herein by reference in its entirety.

With continuing reference to FIG. 4, the various inputs and outputs are shown for each of the components. As shown, the rasterizer 404 generates edge distances which are used by the shader module 406 and texture fetch module 408.

Also shown in FIG. 4 is an optional feedback first-in first-out (FIFO) buffer. When the feedback loop 409 is not utilized, the temporary data calculated internally by the present invention may be dropped before being sent to the texture fetch module 408.

In use, the shader module 406 takes a sequence of texture coordinates (i.e. s, t, r, q), and generates colors (i.e. a, r, g, b). The shader module 406 may come with a "canned" set of built-in programs. Each of these operates on one or more sets of texture coordinate floating point numbers that are interpolated for every pixel, and produce a single set of colors.

As an option, the shader module 406 may be reused, and some of this data (like the barycentric coordinates) may be reused each time a particular group of pixels, or "quad," goes through the shader module 406. If new colors are generated during one pass, these colors may continuously be associated with the quad on subsequent passes. Further, more than one triangle may be processed at a time while employing the feedback loop 409, since data from several triangles generally appears while waiting for the texture fetch module 408 to calculate an individual texture look-up.

To address this, the loopback FIFO 407 may be utilized to hold barycentric weights, colors from previous passes, triangle information, and additional scheduling information to keep track of what the shader module 406 is supposed to do each pass. The FIFO 407 may include a plurality of bits that can be reconfigured to store whatever piece of data is appropriate. When the texture requests for a particular quad are sent to the texture fetch module 408, the associated data may also be placed in the FIFO 407. When the texture requests complete, the results may be combined with the data from the FIFO 407, and a small portion of logic may decide whether to send the completed quad to the combiner 410, or back around for another pass at the shader module 406.

Figure 5:
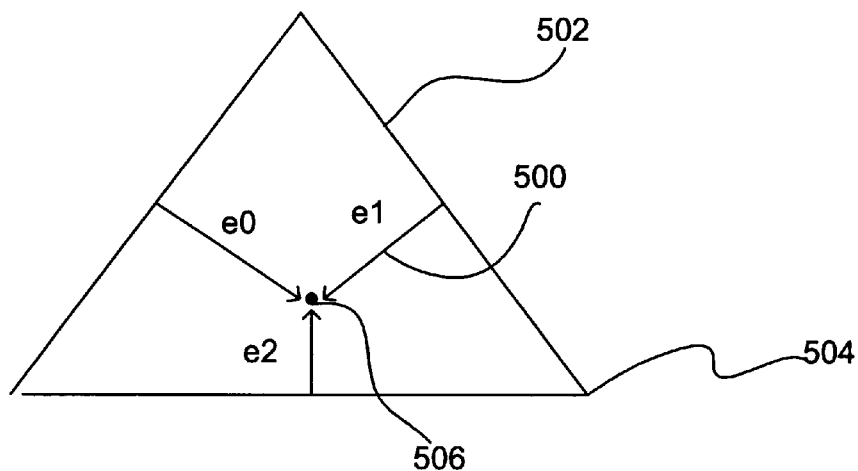
FIG. 5 illustrates a graphical representation of the edge distances generated by the rasterizer in accordance with one embodiment of the present invention.

FIG. 5 illustrates a graphical representation of the edge distances generated by the rasterizer 404. As shown, the edge distances ($e_0$, $e_1$, $e_2$) represent a perpendicular distance 500 from an edge 502 of a primitive 504 to a pixel 506 within the primitive 504. Such edge distances ($e_0$, $e_1$, $e_2$) thus identify the location of the pixel 506 within the primitive 504.

As a function of the shading calculations, various texture look-up operations may be carried out utilizing the texture look-up module 408 in order to obtain output having appropriate texture map colors. To accomplish this, texture coordinates may be sent to the texture look-up module 408. In response thereto, texture information is received from the texture look-up module 408. Such texture information may take any form including, but not limited to filtered texture color, etc.

During the course of use, the feedback loop 409 may be used for performing another shading calculation using the texture information from the texture look-up module 408 in order to generate further output. As an option, the texture information may include filtered texture look-up values for use in retrieving further texture information when the texture information retrieval operation is repeated. The present invention thus allows repeated texture information retrieval and shading calculations in an iterative, programmable manner. In other words, each iteration may be programmed to do a desired shading calculation with or without a texture look-up, where each subsequent iteration may use results of previous texture look-ups for generating further results.

Figure 6:
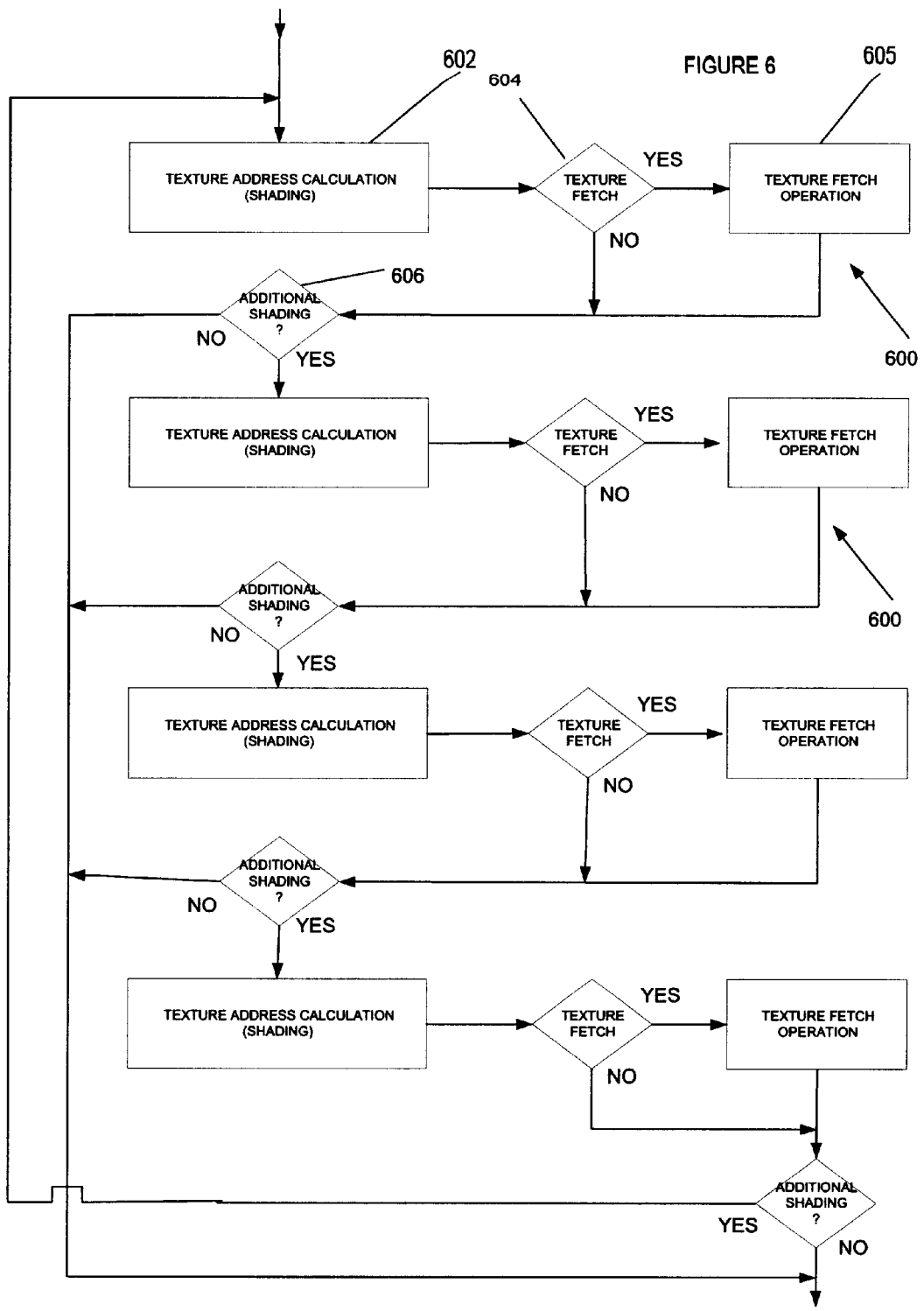
FIG. 6 illustrates a flow diagram depicting the manner in which the shading calculations are interweaved with the texture fetch operations in a plurality of iterations in accordance with one embodiment of the present invention.

In one embodiment of the present invention, at least a pair of texture look-up modules is coupled to a pair of shading modules which together constitute at least four logical modules. Further, the system may be capable of performing both interpolation and shading calculations including pre-texture shading calculations and post-texture shading calculations FIG. 6 illustrates a flow diagram depicting the manner in which the shading calculations are interweaved with the texture fetch operations in a plurality of iterations 600. As shown, each iteration 600 includes a shading calculation 602. During each shading calculation 602, a decision 604 may be made as to whether a texture look-up may be performed. If so, texture information may be retrieved during a texture look-up operation 605. Also during each iteration 600, another decision 606 is made as to whether an additional shading operation 602 is to be executed.

If it is determined in decision 606 that an additional shading operation 602 is to be performed, another iteration 600 is executed. On the other hand, if no further shading operations are to be executed, the process of FIG. 6 may be terminated. During use, the number of iterations may vary per the desires of the user.

As such, decision 604 allows additional texture information to be retrieved in subsequent shading calculations 600 based on previously retrieved texture information. It should be also noted that this may be done on different texture maps. In the alternative, it may be decided in decision 604 to not do a texture look-up, and merely perform a shading calculation 600 during a current iteration.

As mentioned earlier during reference to FIG. 4, the shading module 406 may carry out many various types of operations in order to produce output of various types based on the edge distances ($e_0$, $e_1$, $e_2$) generated by the rasterizer 404. Such output may include, but are not limited to diffuse output colors, fog output values, specular output colors, depth output values, texture color output values, a level of detail (LOD) value, and/or a Z-slope value. As an option, the calculation of a level of detail (LOD) may be performed based on the texture information that is previously retrieved.

In one embodiment, the LOD is calculated numerically. For example, the LOD may be calculated in the manner set forth in a co-pending application entitled "SYSTEM, METHOD AND ARTICLE OF MANUFACTURE FOR CALCULATING A LEVEL OF DETAIL (LOD) DURING COMPUTER GRAPHICS PROCESSING" filed Mar. 24, 2000 under attorney docket number NVIDP0013/P000176 naming Walt Donovan as inventor which is incorporated herein by reference in its entirety.

In particular, four texture coordinates ($u_0$, $u_1$, $u_2$, $u_3$) may be first identified on the texture map corresponding to four portions of a block of pixels. Such texture coordinates may be such that $u_0$ is an upper left corner of the block, $u_1$ is an upper right corner of the block, $u_2$ is a lower left corner of the block, and $u_3$ is a lower right corner of the block. In one embodiment, the block may include a 2×2 block of pixels.

Figure 6A:
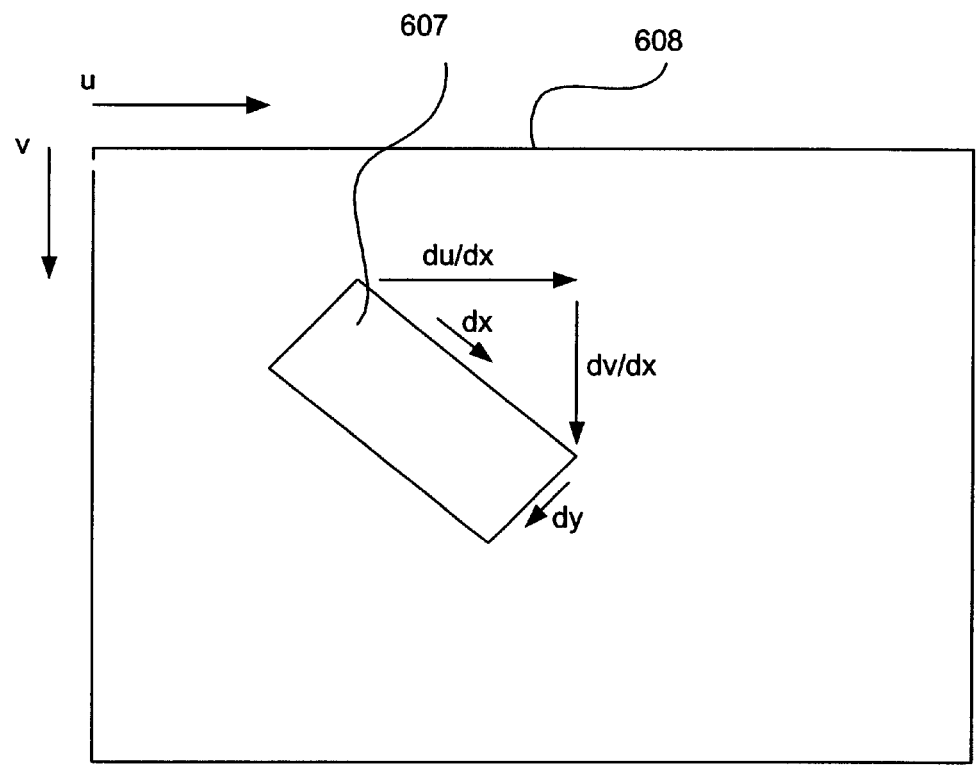
FIG. 6A graphically illustrates the derivative values, ($u_x$) and ($u_y$), with which a level of detail calculation may be performed in accordance with one embodiment of the present invention.

Thereafter, a derivative value ($u_x$), or du/dx, and ($u_y$), or du/dy, are calculated. FIG. 6A graphically illustrates the derivatives values ($u_x$) and ($u_y$). The pixel 607 is mapped in a texture coordinate space 608 with the derivatives values ($u_x$) and ($u_y$) defined as shown.

While the derivative values may be calculated in any known manner, the derivative value ($u_x$), or du/dx, and ($u_y$), or dv/dx, may be estimated using Equations #1.

$$u_x = ((u_1 - u_0) + (u_3 - u_2))/2$$

$$u_y = ((u_2 - u_0) + (u_3 - u_1))/2 \qquad \text{Equations \#1}$$

It should be noted that similar calculations may be made for $v_{x,y}$ and $p_{x,y}$ texture coordinates using the corresponding equations for derivatives with respect to the x and y axis.

With such information, a LOD value is calculated using Equations #2.

$$LOD = \tfrac{1}{2}\log_2(\max(d_x, d_y)), \text{ where}$$

$$d_x = u_x^2 + v_x^2 + p_x^2$$

$$d_y = u_y^2 + v_y^2 + p_y^2$$

Equations #2

In order to accomplish the foregoing shading operations set forth in FIGS. 4 and 6, perspective corrected barycentric weights ($g_0$, $g_1$, $g_2$) may be calculated from the edge distances ($e_0$, $e_1$, $e_2$). In a first embodiment, Equations #3 are utilized to calculate the perspective barycentric weights ($g_0$, $g_1$, $g_2$).

$$g0 = e0 * d$$

$$g1 = e1 * d$$

$$g2 = e2 * d, \text{ where}$$

$$s = e0 * w0 * w1 + e1 * w1 * w2 + e2 * w2 * w0$$

$$d = 1/s, \text{ where}$$

Figure 7:
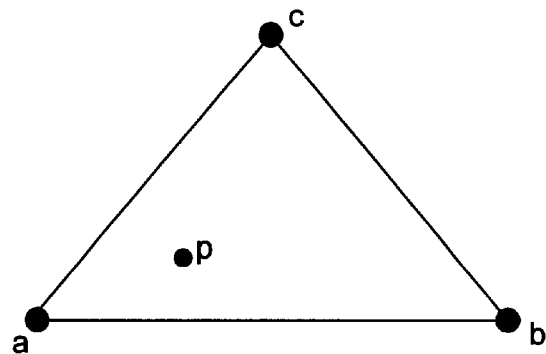
FIG. 7 illustrates a point within a primitive that is capable of being defined by barycentric weights.

Equations #3 w0, w1 and w2 are the perspective correction factors used to perform hyperbolic or perspective corrected interpolation FIG. 7 illustrates a point within a primitive that is capable of being defined by barycentric weights ($g_0$, $g_1$, $g_2$). In particular, point (p) may be defined by Equation #4 in terms of the barycentric weights ($g_0$, $g_1$, $g_2$) and vertices (a, b, c) of the primitive. As an option, the perspective barycentric weights may use parameter values of the primitive in order to perform perspective corrected interpolation of vertex parameter values. Optionally, the perspective barycentric weights may use unclipped parameter values.

$$p = a*g_0 + b*g_1 + c*g_2$$

Equations #4

Given the perspective corrected barycentric weights ($g_0$, $g_1$, $g_2$), the various shading calculations may be performed using the equations set forth in Table 1.

TABLE 1

Z in Screen Space(depth) - Calculate screen space z values at the vertices, then interpolate them per-pixel using the edge values as non-perspective corrected weights.
zs0 = zc0 / wc0; zs1 = zc1 / wc1; zs2 = zc2 / wc2.
zs = ( e0 zs0 + e1 zs1 + e2 zs2 ) / ( e0 + e1 + e2)
Fog - Interpolate the fog range (may be affine xform of z eye, or distance from eye point -- both computed per vertex).
Call fog range from xform fr.
fr = g0*fr0 + g1*fr1 + g2*fr2
then retrieve frac(fr) and run it through either:
    1) no table
    2) exp table
    3) exp^2 table
Note: This table could be implemented as a texture map lookup. This would allow one to do an Opengl fog table.
4 (or any other number of) Non-projective 2-D Texture Coordinates - This optimization can only be done if all q's are one. Otherwise, the 2 projective case below is performed.
s = g0*s0 + g1*s1 + g2*s2
t = g0*t0 + g1*t1 + g2*t2
2-D Projective or Cube Texture Coordinates
2-D:

sq = g0*s0 + g1*s1 + g2*s2
tq = g0*t0 + g1*t1 + g2*t2
q = g0*q0 + g1*q1 + g2*q2, where
qi = 1/q TABLE 1-continued s = sq*qi
t = tq*qi
Cube:

sr = g0*s0 + g1*s1 + g2*s2
tr = g0*t0 + g1*t1 + g2*t2
rr = g0*r0 + g1*r1 + g2*r2
f = pickmax(s,t,r)
Note: f is a face index beginning at zero (for s). Pick is a function that chooses the fth entry from the list passed to it, where f is first parameter.
sr = pick(f,tr,rr,sr)
tr = pick(f,rr,sr,tr)
r = pick(f,sr,tr,rr), where
ri = 1/r
s = sr*ri
t = tr*ri
3-D projective textures -
sq = g0*s0 + g1*s1 + g2*s2
tq = g0*t0 + g1*t1 + g2*t2
rq = g0*r0 + g1*r1 + g2*r2
q = g0*q0 + g1*q1 + g2*q2, where
qi = 1/q
s = sq*qi
t = tq*qi
r = rq*qi
2-D dependent texture lookup -- After the first texture lookup, two components of the argb color are reinterpreted as texture coordinates, and looked up again.
Dx6 Bump Mapping - After the first texture look-up, color r0,g0,b0 is received which is multiplied by 2x2 basis matrix, which is constant. s1 and t1 are the interpolated texcoords for the second look-up.
s1p = m11*r0 + m12*g0 + s1
t1p = m21*r0 + m22*g0 + t1
After the second texture lookup, received is r1,g1,b1,a1.
f = (b0*m31 + m32)
r1p = r1*f
g1p = b1*f
b1p = b1*f
a1p = a1
Polygon Offset - let the notation z(1,0) indicate the z value of the pixel in the bottom right corner of the pixel block, or quad. z(0,1) would be the top left.
compute the z slopes:
zx0 = z(1,0) - z(0,0)
zy0 = z(0,1) - z(0,0)
factor = max(abs(zx0),abs(zy0))
compute a new z:
zo = z + factor*zs + units, where factor and units are state. Loaded with pipelined state bundles.
Dot Product-based texture mapping - Using s0, t0, a first texture look-up is performed. Call the results a0 b0 c0. Dot products are taken between these values and the subsequent texture coordinates to generate a new set of texture coordinates for a subsequent texture lookup:
sp = s1 * a0 + t1 * b0 + r1 * c0
tp = s2 * a0 + t2 * b0 + r2 * c0
2-D texture lookup performed using (sp, tp).
or
sp = s1 * a0 + t1 * b0 + r1 * c0
tp = s2 * a0 + t2 * b0 + r2 * c0
rp = s3 * a0 + t3 * b0 + r3 * c0
3-D texture lookup performed using (sp, tp, rp)
or
Cube Texture coordinates performed (as above) using (sp, tp, rp)
Reflective Bump Mapping - Using s0, t0, a first texture look-up is performed. Call the results hs,ht,hr. this is the normal in tangent space.
interpolate s1, t1, r1. -- this is the surface tangent vector in eye space
interpolate s2, t2, r2. -- this is the surface binormal vector.
interpolate s3, t3, r3. -- this is the surface normal vector.
These are used as a basis matrix by which to multiply the vector hs,ht,hr. This will give the normal in eye space.
so,
nx = s1*hs + s2*ht + s3*hr;
ny = t1*hs + t2*ht + t3*hr;
nz = r1*hs + r2*ht + r3*hr;
Use the (nx,ny,nz) vector as a cube map lookup for the diffuse lighting component.
Now compute the reflection vector per pixel.
let ne = nx*ex+ny*ey+nz*ez;

TABLE 1-continued

```
let n2 = nx*nx + ny*ny + nz*nz;
rx = 2*nx*ne/n2 – ex;
ry = 2*ny*ne/n2 – ey;
rz = 2*nz*ne/n2 – ez;
Use this reflection vector as a cube map lookup.
Depth Texture Mapping with Dot Products - Using s0, t0, a first texture
look-up is performed. Call the results a0, b0, c0. Dot products are
performed between these values and two subsequent sets of texture
coordinates to produce z clip and w clip values. These quotient of these
values replaces the previously calculated z screen value.
zc = a0 * s1 + b0 * t1 + c0 * r1;
wc = a0 * s2 + b0 * t2 + c0 * r2;
zs = zc / wc
Pixel culling - The s, t, r, and q coordinates for a particular texture are
interpolated per-pixel. Each coordinate is individually configured to check
for either negative or non-negative values. If the texture coordinate
matches the configuration, the pixel is culled (not drawn).
Isotropic BRDF- The results of two texture coordinate lookups are
interpreted as 16-bit numbers, h0, l0 and h1, l1. A third texture lookup
is performed using (h0, h1, 10–11).
```

It should be understood that each of the options set forth in the foregoing tables may be adapted to reuse common portions of the hardware set forth in FIG. 4. As set forth earlier, such hardware is capable of interpolating and performing texture address calculations during general operation.

Table 1 is based on perspective corrected barycentric weights ($g_0$, $g_1$, $g_2$). In another embodiment, non-perspective corrected barycentric weights ($g_0$, $g_1$, $g_2$) may be utilized which are defined in Equations #5. Non-perspective corrected barycentric weights replace perspective correct weights when texture coordinates, colors, depth, or fog are being interpolated.

$g0 = e0*d$ $g1 = e1*d$ $g2 = e2*d$, where $s = e0 + e1 + e2$ $d = 1/s$                                                                 Equations #5

More information will now be set forth regarding the equations set forth in Table 1, as well as other shading programs, modes, calculations, etc. that may be performed using the architecture set forth hereinabove.

Null

In the present mode, the color that is generated is black (i.e. 0xff000000). However, the texture coordinates may be used for some other purpose by programs that come after it, and for programs that require multiple sets of texture coordinates.

TEXTURE MODES

2D Projective Texture

This mode is a two-dimensional, projective texture lookup. Note Equation #6.

$argb = texture(s/q, t/q)$                                    Equation #6

3D Projective Texture

This mode is a three-dimensional, projective texture lookup. Note Equation #7.

$argb = texture(s/q, t/q, r/q)$                              Equation #7

Cube Map Texture

The present texture map projects the specified texture coordinate vector (s, t, r) onto a unit cube, and looks up the texture on the surface of the cube. The texture map is specially designed so as to contain information for all six faces of the cube. It performs as if it were composed of six separate 2D texture maps, texture0 through texture5. Note Table 2.

TABLE 2

```
Determine which of s, t, and r has the largest absolute value:
    If s is the largest,
        If s is negative, argb = texture0( –r / s, –t / s)
        If s is positive, argb = texture1( –r / s, t / s)
    If t is the largest,
        If t is negative, argb = texture2( –s / t, –r / t)
        If t is positive, argb = texture3( s / t, –r / t)
    If r is the largest,
        If r is negative, argb = texture4( s / r, –f / r)
        If r is positive, argb = texture5( s / r, t / r)
```

SPECIAL MODES

Pass Through

The present shader program converts the texture coordinate values (s, t, r, q) directly to colors (r, g, b, a). In use, each component is clamped to [0.0, 1.0], multiplied by 255, and stored in the appropriate register.

Pixel Kill

The present shader program is used to "kill" unwanted pixels. Depending on whether the texture coordinate values (s, t, r, q) are negative or non-negative, the pixel is not drawn. Separate control bits provide per-coordinate control as to whether negative values are culled, or non-negative values are culled.

SIMPLE DEPENDENT TEXTURES

Isotropic Bidirectional Reflectance Distribution Function

The present shader program uses the results of two previous texture shader results to produce lighting using an isotropic bidirectional reflectance distribution function. It may be assumed that a texture has been created which uses the cube map to convert a 3-D vector into spherical coordinates ($\Phi$, $\phi$). Such spherical coordinates are stored as two 16-bit unsigned numbers.

In use, one can make use of the vertex shader to calculate vectors from the surface of an object to both the eye and the light in a coordinate space defined by the surface normal. To do this, one may use three pixel shader programs, ending with a "BRDF" program.

In the first shader program, one may use the aforementioned "cube map→spherical texture" function to calculate spherical coordinates to the eye, ($\Phi_e$, $\phi_e$). In a second shader program, the "cube map→spherical texture" function may be used again to calculate spherical coordinates to the light, ($\Phi_l$, $\phi_l$).

It should be noted that because of filtering issues, this conversion texture may need to be filtered as a nearest-neighbor. If linear filtering were used, adjacent spherical coordinates of 0 and $2\pi$ would be incorrectly blended together.

Finally, the "BRDF" program may be used for the third shader program. In use, it takes the results of the two previous programs, remaps them from [0,65535] to [0.0, 1.0], and calculates Equation #8.

$$d\phi = \phi_1 - \phi_e, \text{ with } d\phi \text{ on } [-1.0, 1.0]$$ Equation #8

Thereafter, the "BRDF" program performs a 3D texture lookup for the final color value. See Equation #9.

$$argb = \text{texture3D}(\Phi_e, \Phi_1, d\phi)$$ Equation #9

The third (delta) texture coordinate may be set to a wrap mode, since angular values that are off by $2\pi$ are equivalent. That is, a value of 0.25 ($\pi/2$) should be the same as a value of −0.75 (−3$\pi$/2).

Dependent AR Texture/Dependent GB Texture

The two shader programs above provide a more general dependent texture mechanism. Unlike the bump environment map program, dependent AR and dependent GB textures may use the color results from any previous texture, instead of just an immediate predecessor. In use, the previous colors, (alpha_rev, red_prev, green_prev, blue_prev) are taken, all the values from [0,255] to [0.0, 1.0] are remapped, and output color is looked up utilizing either of the functions in Table 3, as appropriate.

TABLE 3 argb = texture2D( alpha_prev, red_prev)
argb = texture2D( green_prev, blue_prev)

REMAPPED DEPENDENT TEXTURES

All of the dependent texture modes in the present section may use a "remapper" to convert one or more previously generated 32-bit color values into an (a, b, c) floating point triple. These remapped values are used differently, depending on the particular shader program. However, all the modes in this section may use the same remapper.

Remapping happens in two parts. Initially, there's an initial remap mode, which specifies how to generate "a" and "b" and a default value for "c", and a ThirdMapping mode, which can override the default for "c." See Table 4 for exemplary mapping modes.

TABLE 4

ZERO_TO_1: Treat the 32-bit color as a concatenation of 4 unsigned 8-bit numbers, argb. Remap the color components from [0,255] to [0.0, 1.0] (divide by 255), for each component of the vector ( r, g, b ).
MINUS_1_TO_1_MS: Treat the 32-bit color as a concatenation of 4 unsigned 8-bit numbers, argb. Remap the color components from [0,255] to [−1.0, 1.0] (subtract 128, then divide by 127), for each component of the vector ( r, g, b ).
MINUS_1_TO_1_GL: Treat the 32-bit color as a concatenation of 4 signed 8-bit numbers, argb. Remap the color components from [−128, 127] to [−1.0,1.0] (add .5, then divide by 127.5), for each component of the vector ( r, g, b ).
MINUS_1_TO_1_NV: Treat the 32-bit color as a concatenation of 4 signed 8-bit numbers, argb. Remap the color components from [−128, 127] to [−1.0,1.0] (divide by 127), for each component of the vector ( r, g, b ).
HILO_1: Treat the 32-bit color as a concatenation of 2 unsigned 16-bit numbers, hl. Remap the color components from [0,65535] to [0.0, 1.0], (divide by 65535) and use the vector ( h, l, 1.0 ).
HILO_HEMISPHERE_MS: Treat the 32-bit color as a concatenation of 2 signed 16-bit numbers, hl. Remap the color components from [−32768,32767] to [−1.0, 1.0] (divide by 32768), and use the vector ( h, l, sqrt( max(0,1.0 − h*h − l*l )) ).
HILO_HEMISPHERE_GL: Treat the 32-bit color as a concatenation of 2

TABLE 4-continued signed 16-bit numbers, hl. Remap the color components from [−32768,32767] to [−1.0, 1.0] (add .5, then divide by 32767.5), and use the vector ( h, l, sqrt( max( 0, 1.0 − h*h − l*l )) ).
HILO_HEMISPHERE_NV: Treat the 32-bit color as a concatenation of 2 signed 16-bit numbers, hl. Remap the color components from [−32768,32767] to [−1.0, 1.0] (divide by 32767), and use the vector ( h, l, sqrt( max( 0, 1.0 − h*h − l*L )) ).
HILO_BIAS_NV: Treat the 32-bit color as a concatenation of 2 unsigned 16-bit numbers, hl. Remap the color components from [0,65535] to [−1.0, 1.0] (subtract 32768, then divide by 32767), and use the vector ( h, l, sqrt ( max( 0, 1.0 − h*h − l*l )) ).
BUMPENV_BGR_NV: Treat the 32-bit color as a concatenation of 4 8-bit numbers, argb. Treat the b and g components as signed, and remap them from [−128,127] to [−1.0,1.0] (divide by 127). Treat the r component as unsigned, and remap it from [0,255] to [0.0,1.0] (divide by 255). The output vector is (b, g, r). This mode sets things up to be compatible with the a bump environment map mode.
BUMPENV_RGB_NV: Treat the 32-bit color as a concatenation of 4 8-bit numbers, argb. Treat the r and g components as signed, and remap them from [−128,127] to [−1.0,1.0] (divide by 127). Treat the b component as unsigned, and remap it from [0,255] to [0.0,1.0] (divide by 255). The output vector is ( r, g ,b ).
REPLICATE_FLOAT: Treat the 32-bit color (argb) as a raw IEEE floating point number f. The output vector is (f,f,f).

All of the above modes may use any previous shader output color as an input. The remaining remapping mode uses specific colors, and may only be used on the last texture. See Table 5.

TABLE 5

THREE_FLOATS: Treat the 32-bit colors (argb) of textures 0, 1, and 2 as raw IEEE floating point numbers $f_0$, $f_1$, and $f_2$. The output vector is ($f_0$, $f_1$, $f_2$).

In all the non-FLOAT modes, the third value (c), can be overridden to be explicitly 0.0, 1.0, or the hemisphere completion of the first two values (sqrt( max(0, 1.0−a*a−b*b))).

Dependent RGB

Figure 8:
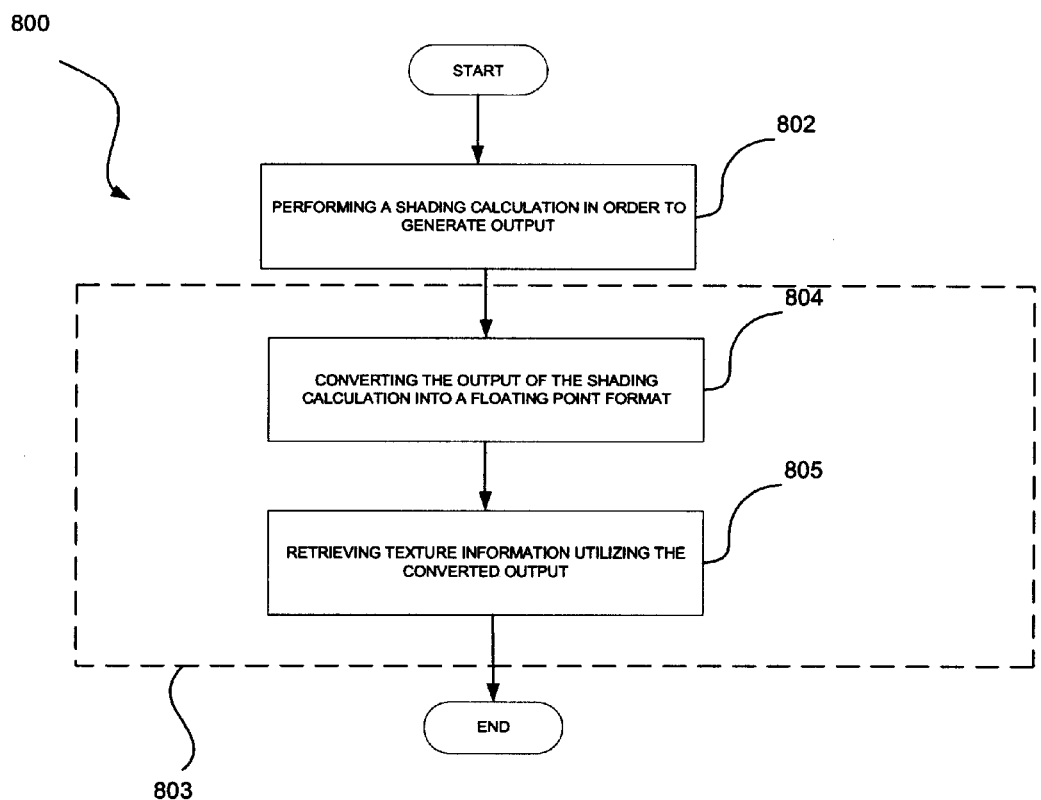
FIG. 8 illustrates a method for performing shader calculations in a graphics pipeline, in accordance with one embodiment.

FIG. 8 illustrates a method 800 for performing shader calculations in a graphics pipeline, in accordance with one embodiment. Initially, in operation 802, a shading calculation is initially performed in order to generate output in the form of a texture address. Note again operation 602 of FIG. 6.

Next, in operations 803, an additional shading calculation is performed. Such additional shading calculation includes converting the output of the shading calculation into a floating point format. See operation 804. As an option, the output may be converted into the floating point format utilizing a remapping operation.

In operation 805, texture information is subsequently retrieved utilizing the converted output. Optionally, the texture information may be two-dimensional, three-dimensional, etc. Still yet, the texture information may include a cubemap, as will soon become apparent.

As set forth in the overview method of FIG. 6, the additional shading calculation may be repeated. Further, the output of the shading calculations may be combined. As an option, at least one additional shading calculation may be performed using the texture information.

The present shader program provides yet another permutation of a direct dependent lookup. In use, it sets up texture coordinates using the results of the remapper. Note Table 6.

TABLE 6 argb = texture2D( a, b )
argb = texture3D( a, b, c )

Dependent Cube

This shader program uses the remapper to perform a cubemap. Also, the remapper results (a, b, c) are used as the texture coordinates (s, t, r) for a cubemap lookup.

Bump Environment Map

The present shader program implements bump environment map functionality. It uses the color value produced by some previous pixel shader to modify the texture coordinates for a present texture lookup. It uses a 2-by-2 matrix of floating point numbers [red_ds, red_dt, green_ds, green_dt] to calculate the new texture coordinates.

Given the remapper output (a, b, c), the shader then calculates Equation #10.

$$\text{argb}=\text{texture2D}(s+\text{blue\_}ds*a+\text{green\_}ds*b, t+\text{blue\_}dt*a+\text{green\_}dt*b) \quad \text{Equation \#10}$$

To implement the bump environment map functionality, the first pixel shader in the sequence may be an ordinary 2D texture, and subsequent pixel shaders may use the present program. It should be noted that in this mode, c is ignored.

Bump Environment/Luminance Map

This shader program is an extension of the previous program. It implements bump environment maps, with an additional post-process luminance map. It has the additional floating-point parameters: lum_scale and lum_bias. After the argb value above is calculated, the luminance factor is calculated by computing Equation #11.

$$\text{lum}=\text{lum\_bias}+\text{lum\_scale}*c \quad \text{Equation \#11}$$

In use, the red, green, and blue components of the argb from the texture lookup are individually multiplied by the foregoing lum factor, clipped to [0.0, 1.0], and converted back to colors on [0,255].

It should be noted that this multiplication takes place after all pixel shaders have finished their calculations, but immediately before the results are sent to the combiners. Other pixel shaders referring to a luminance map texture may see the results of the bump environment map, but not the results of the luminance map.

Projective Bump Environment Map

The present shader program works similar to the bump environment map program, except that it uses s/q and t/q in place of s and t for the texture coordinate calculation.

Projective Bump Environment/Luminance Map

The present shader program works similar to the bump environment/luminance program, except that it uses s/q and t/q in place of s and t for the texture coordinate calculation.

Tex DP3 Passthrough

Figure 9:
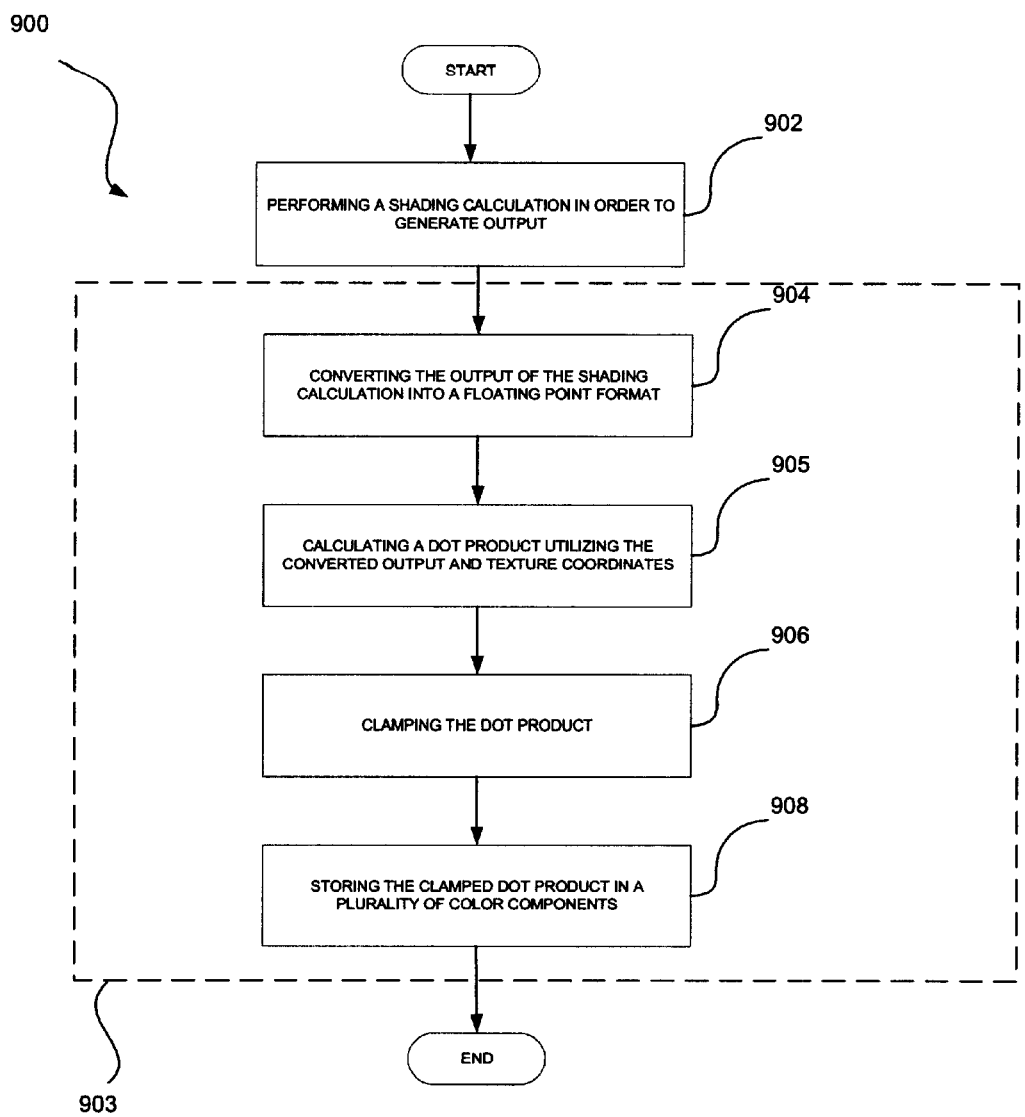
FIG. 9 illustrates another method for performing shader calculations in a graphics pipeline, in accordance with one embodiment.

FIG. 9 illustrates a method 900 for performing shader calculations in a graphics pipeline, in accordance with one embodiment. Initially, in operation 902, a shading calculation is initially performed in order to generate output in the form of a texture address. Note again operation 602 of FIG. 6.

Thereafter, in operations 903, an additional shading calculation is carried out. Such additional shading calculation includes converting the output of the shading calculation into a floating point format. Note operation 904. In one embodiment, the output may be converted into the floating point format utilizing a remapping operation.

Further, in operation 905, a dot product is calculated utilizing the converted output and texture coordinates. The dot product is then clamped in operation 906. Optionally, the dot product may be clamped to [0.0, 1.0]. Next, in operation 908, the clamped dot product is stored in a plurality of color components. As yet another option, the clamped dot product may be stored in the color components utilizing a smearing operation. Still yet, the color components may include an A-component, an R-component, a G-component, and a B-component.

As set forth earlier during reference to FIG. 6, the additional shading calculation may be repeated. Further, the output of the shading calculations may be combined. As an option, texture information may be retrieved using the texture coordinates which are associated with the output of the shading calculation. As such, the additional shading calculation may be performed using the texture information.

The present shader program thus takes the dot product of the colors (a, b, c) of the remapper results with the texture coordinates (s, t, r). It then clamps the product to [0.0, 1.0], and stores the result in all 4 ARGB output color components.

Tex DP3 Texture

Figure 10:
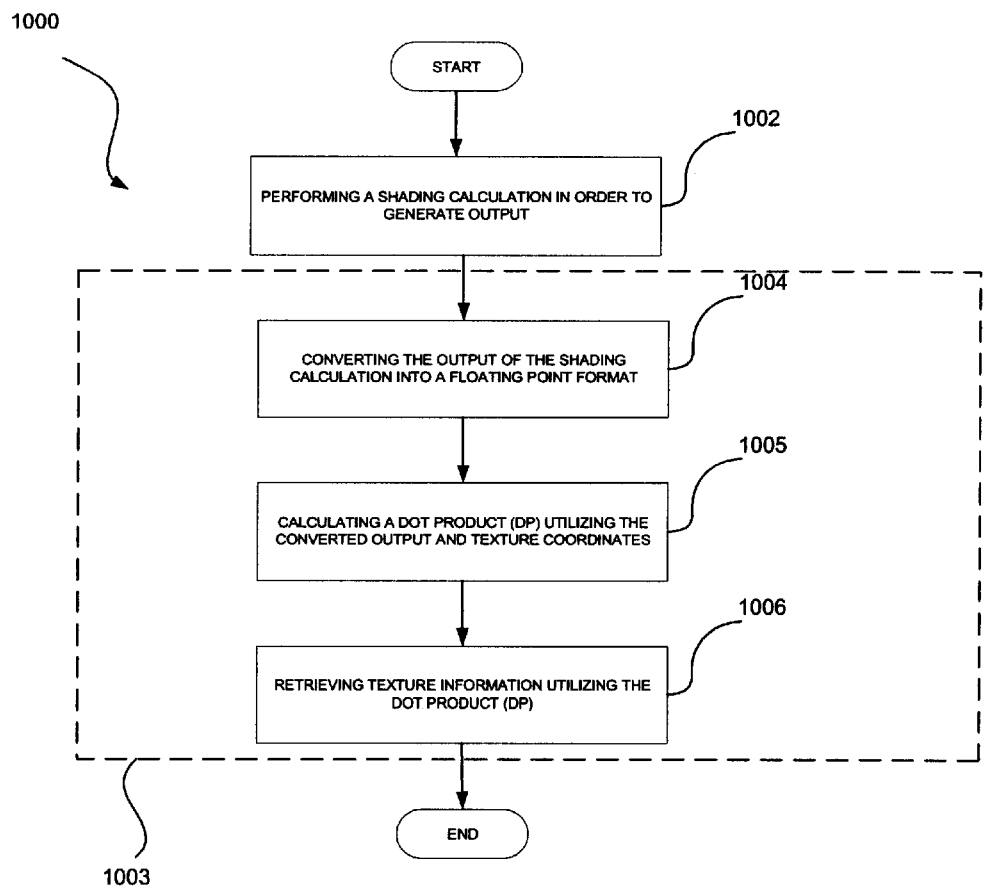
FIG. 10 illustrates yet another method for performing shader calculations in a graphics pipeline, in accordance with one embodiment.

FIG. 10 illustrates a method 1000 for performing shader calculations in a graphics pipeline, in accordance with one embodiment. Initially, in operation 1002, a shading calculation is initially performed in order to generate output in the form of a texture address. Note again operation 602 of FIG. 6.

Next, an additional shading calculation is carried out. Note operations 1003. Such additional shading calculation converts the output of the shading calculation into a floating point format. See operation 1004. In one embodiment, the output may be converted into the floating point format utilizing a remapping operation.

Subsequently, in operation 1005, a dot product (dp) is calculated utilizing the converted output and texture coordinates. Thereafter, texture information is retrieved utilizing the dot product (dp). Note operation 1006. As an option, the texture information may be one-dimensional, two-dimensional, etc. Further, the texture information may be retrieved utilizing coordinates (dp,0).

In another embodiment, the additional shading calculation may be repeated. Further, the output of the shading calculations may be combined. As an option, at least one additional shading calculation may be performed using the texture information.

The present shader program thus takes the dot product of the colors (a, b, c) of the remapper results with the texture coordinates (s, t, r), producing dp. It then performs a 1-D texture lookup with that coordinate, or a 2-D texture lookup with coordinates (dp, 0).

Tex DP3 Depth

The present shader program takes the dot product of the colors (a, b, c) of the remapper results with the texture coordinates (s, t, r). It then replaces the depth value for this pixel with the result of the dot product.

MULTI-STAGE DOT PRODUCT TEXTURE PROGRAMS

By providing access to a generalized dot product mechanism for texture coordinate generation, the pixel shader becomes much more flexible, without becoming fully programmable.

Each individual texture coordinate is generated using a dot product between the actual texture coordinates (s, t, r) specified, and some other color vector (a, b, c) generated by the remapper.

Since each texture coordinate used in the actual lookup requires its own set of texture coordinates (s, t, r), the following programs actually use up two or three sets of texture coordinates.

Dot Product ST

The present dot product program uses two dot products to provide coordinates for a two-dimensional texture lookup. It uses two sets of texture coordinates, and one or two colors. Note Equation #12.

$$argb=\text{texture2D}((s_0,t_0,r_0)\cdot(a_a,b_a,c_a),(s_1,t_1,r_1)\cdot(a_b,b_b,c_b)) \quad \text{Equation \#12}$$

Dot Product STR

The present dot product program uses three dot products to provide coordinates for a three-dimensional texture lookup. It uses three sets of texture coordinates, and up to three different colors. Note Equation #13.

$$argb=\text{texture3D}((s_0,t_0,r_0)\cdot(a_a,b_a,c_a),(s_1,t_1,r_1)\cdot(a_b,b_b,c_b)\cdot\ldots) \quad \text{Equation \#13}$$

By carefully generating the texture coordinates using a vertex shader, they can be the rows of a 3×3 matrix, allowing for a matrix transformation at every pixel.

Dot Product Cube Map

The last of the simple dot product programs uses three dot products to provide the coordinates for a three-dimensional cube map lookup. It uses three sets of texture coordinates, and up to three different colors. It builds coordinates similar to the Dot Product STR program, but runs them through the cube map renormalization afterwards. Note Equation #14.

$$argb=\text{textureCube}((s_0,t_0,r_0)\cdot(a_a,b_a,c_a),(s_1,t_1,r_1)\cdot(a_b,b_b,c\ldots)) \quad \text{Equation \#14}$$

Dot Product ZW

The present dot product program goes beyond performing a texture lookup. Instead, after the two texture coordinates are generated, the first texture coordinate is divided by the second, and the result is used as the z-coordinate for that pixel. This allows z values to be affected by a texture map offset, providing something similar to displacement mapping. Note Equation #15.

$$z_a=(s_0,t_0,r_0)\cdot(a_a,b_a,c_a),$$
$$w_a=(s_1,t_1,r_1)\cdot(a_b,b_b,c_b),$$
$$z_{final}=z_a/w_a. \quad \text{Equation \#15}$$

Dot Product Reflect Diffuse

Dot Product Reflect Specular Constant-Eve

Dot Product Reflect Specular

The present programs extend the Dot Product STR program in such a way as to calculate the diffuse and specular components of light interacting with a true bump map. First, an ordinary texture lookup is used to find a normal vector relative to an object's surface, $n_{surface}$. Such a normal would usually be interpreted using either the signed-8-bit interpretation or the hemisphere interpretation.

Using three dot products, this normal is then multiplied by a 3×3 matrix composed of the eye space surface tangent, binormal, and normal, producing the normal in eye space, $n_{eye}$. At this point, the diffuse color is looked up using a cube map. See Equation #16.

$$argb_{diffuse}=\text{textureCube}(n_{eye\,x},n_{eye\,y},n_{eye\,z}). \quad \text{Equation \#16}$$

An eye vector, e, is combined with this normal to produce a reflection vector, r. Note Equation #17.

$$r=2n_{eye}(n_{eye}\cdot e)/(n_{eye}\cdot n_{eye})-e \quad \text{Equation \#17}$$

To produce the final specular color, this reflection vector is looked up using a cube map. Note Equation #18.

$$argb_{specular}=\text{textureCube}(r_x,r_y,r_z) \quad \text{Equation \#18}$$

If only the specular component is needed, the Dot Product Reflect Specular program can be used without its diffuse counterpart. If only the diffuse component is needed, Dot Product STR produces the appropriate results.

The specular constant-eye program gets its eye vector, e, from a user-supplied value, which is constant across the triangle. The Dot Product Reflect Specular program gets an eye vector e from the q coordinates of the three dot product textures. That is, e=(q1, q2, q3).

EXPERIMENTAL PURE FLOATING-POINT PROGRAMS

The shader hardware has a lot of floating point capability. The present programs provide somewhat more direct access to such capability. In these modes, the 32-bit color coming from textures and being written to output colors is treated as a raw IEEE float. This isn't ideal, since the texture unit can't filter such entities, and the combiners can't perform math on them. Further, the system can only access one floating point channel at a time; attempts to do multiple floating point channels would require multiple frame buffers.

The present shader modes are available depending on a configuration bit, which may never be enabled if desired. The THREE_FLOATS and REPLICATE_FLOAT remapping modes can also be enabled or disabled based on this configuration bit.

Float Passthrough s

The interpolated "s" coordinate is stored as the output color by just copying the bits over.

Float Mad

Using the color values (a, b, c) of the remapper output, the present mode calculates a*b+c, and stores the result as the output color.

Float Reciprocal

Using the color values (a, b, c) of the remapper output, the present mode calculates 1/a, and stores the result as the output color. "b" and "c" are ignored.

Float Dot Product

The present mode calculates the dot product of the color values (a, b, c) of the remapper output and the interpolated texture coordinates (s, t, r). The result is stored as the output color.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for performing shader calculations in a graphics pipeline, comprising:
   (a) performing a shading calculation in order to generate output; and
   (b) performing an additional shading calculation including:
      (i) converting the output of the shading calculation into a floating point format,
      (ii) calculating a dot product utilizing the converted output and texture coordinates,
      (iii) clamping the dot product, and
      (iv) storing the clamped dot product in a plurality of color components.

2. The method as recited in claim 1, wherein the output is converted into the floating point format utilizing a remapping operation.

3. The method as recited in claim 1, wherein the dot product is clamped to [0.0, 1.0].

4. The method as recited in claim 1, wherein the clamped dot product is stored in the color components utilizing a smearing operation.

5. The method as recited in claim 1, wherein the color components include an A-component, an R-component, a G-component, and a B-component.

6. The method as recited in claim 1, and further comprising repeating operation (b).

7. The method as recited in claim 1, and further comprising combining the output of operations (a) and (b).

8. The method as recited in claim 1, and further comprising retrieving texture information using the texture coordinates which are associated with the output of the shading calculation of operation (a), wherein the additional shading calculation is performed using the texture information.

9. A method for performing shader calculations in a graphics pipeline, comprising:
   (a) performing a shading calculation in order to generate output; and
   (b) performing an additional shading calculation including:
      (i) converting the output of the shading calculation into a floating point format,
      (ii) calculating a dot product (dp) utilizing the converted output and texture coordinates, and
      (iii) retrieving texture information utilizing the dot product (dp).

10. The method as recited in claim 9, wherein the output is converted into the floating point format utilizing a remapping operation.

11. The method as recited in claim 9, wherein the texture information is one-dimensional.

12. The method as recited in claim 9, wherein the texture information is two-dimensional.

13. The method as recited in claim 9, wherein the texture information retrieved utilizing coordinates (dp,0).

14. The method as recited in claim 9, and further comprising repeating operation (b).

15. The method as recited in claim 14, and further comprising combining the output of operations (a) and (b).

16. The method as recited in claim 15, wherein at least one of the additional shading calculations is performed using the texture information.

17. A method for performing shader calculations in a graphics pipeline, comprising:
   (a) performing a shading calculation in order to generate output; and
   (b) performing an additional shading calculation including:
      (i) converting the output of the shading calculation into a floating point format, and
      (ii) retrieving texture information utilizing the converted output.

18. The method as recited in claim 17, wherein the output is converted into the floating point format utilizing a remapping operation.

19. The method as recited in claim 17, wherein the texture information is two-dimensional.

20. The method as recited in claim 17, wherein the texture information is three-dimensional.

21. The method as recited in claim 17, wherein the texture information includes a cubemap.

22. The method as recited in claim 17, and further comprising repeating operation (b).

23. The method as recited in claim 22, and further comprising combining the output of operations (a) and (b).

24. The method as recited in claim 23, wherein at least one of the additional shading calculations is performed using the texture information.

25. A method for interweaving shading calculations and texture retrieval operations during texture sampling in a graphics pipeline, comprising:
   (a) performing a shading calculation in order to generate output;
   (b) retrieving texture information using texture coordinates associated with the output;
   (c) performing an additional shading calculation using the texture information in order to generate further output, said additional shading calculation including a dot product;
   (d) repeating operations (b)–(c).

26. A computer program product for interweaving shading calculations and texture retrieval operations during texture sampling in a graphics pipeline, comprising:
   (a) computer code for performing a shading calculation in order to generate output;
   (b) computer code for retrieving texture information using texture coordinates associated with the output;
   (c) computer code for performing an additional shading calculation using the texture information in order to generate further output, said additional shading calculation including a dot product;
   (d) computer code for repeating code segments (b)–(c).

27. A system for interweaving shading calculations and texture retrieval operations during texture sampling in a graphics pipeline, comprising:
   (a) logic for performing a shading calculation in order to generate output;
   (b) logic for retrieving texture information using texture coordinates associated with the output;
   (c) logic for performing an additional shading calculation using the texture information in order to generate further output, said additional shading calculation including a dot product;
   (d) logic for repeating logic operations (b)–(c).

28. A method for interweaving shading calculations and texture retrieval operations during texture sampling in a graphics pipeline, comprising:
   (a) performing a shading calculation in order to generate output;
   (b) retrieving texture information using texture coordinates associated with the output;
   (c) performing an additional shading calculation using the texture information in order to generate further output, said additional shading calculation selected from the group consisting of a dependent look-up, a dot-product passthrough operation, and a dot-product texture operation;
   (d) repeating operations (b)–(c).

* * * * *